(12) United States Patent
Reimchen

(10) Patent No.: US 8,920,090 B2
(45) Date of Patent: Dec. 30, 2014

(54) CAPTIVE SECURING MEANS FOR A SCREW

(75) Inventor: Valeri Reimchen, Steinheim Sandebeck (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 119 days.

(21) Appl. No.: 13/275,846

(22) Filed: Oct. 18, 2011

(65) Prior Publication Data

US 2012/0114445 A1 May 10, 2012

(30) Foreign Application Priority Data

Oct. 19, 2010 (DE) .......................... 10 2010 038 267

(51) Int. Cl.
*F16B 41/00* (2006.01)

(52) U.S. Cl.
CPC ............ *F16B 41/002* (2013.01); *Y10S 411/999* (2013.01)
USPC .......................................... 411/353; 411/999

(58) Field of Classification Search
USPC .................................................. 411/353, 999
See application file for complete search history.

(56) References Cited

U.S. PATENT DOCUMENTS

| | | | | |
|---|---|---|---|---|
| 3,394,747 A | * | 7/1968 | Duffy | 411/353 |
| 4,558,494 A | * | 12/1985 | Kraus | 24/297 |
| 5,824,253 A | | 10/1998 | Kassardjian | |
| RE36,164 E | * | 3/1999 | Johnson et al. | 411/353 |
| 6,174,118 B1 | | 1/2001 | Rebers et al. | |
| D508,199 S | * | 8/2005 | Winig et al. | D8/356 |
| 7,029,221 B2 | * | 4/2006 | Kovac | 411/512 |
| 7,210,885 B2 | * | 5/2007 | Pinzl | 411/353 |
| 7,553,178 B1 | * | 6/2009 | Wertz et al. | 439/331 |
| 2004/0022600 A1 | | 2/2004 | Kovac | |

FOREIGN PATENT DOCUMENTS

| | | |
|---|---|---|
| CH | 511522 A | 9/1971 |
| DE | 9316108 U1 | 4/1994 |
| DE | 9416583 U1 | 1/1995 |
| DE | 19523932 A1 | 2/1996 |
| FR | 2378201 A1 | 8/1978 |
| FR | 2698669 A1 | 6/1994 |

* cited by examiner

*Primary Examiner* — Flemming Saether
(74) *Attorney, Agent, or Firm* — Jonathan A. Kidney; TechLaw, LLP

(57) ABSTRACT

A captive securing means for a screw has a shaft for holding the screw and a retaining means arranged in the shaft, the retaining means resting, in the inserted state of the screw, at a tangential point on the outer circumferential surface of the screw, the retaining means arranged on the inner circumferential surface of the shaft, and the retaining means extending from the inner circumferential surface of the shaft into the free region of the shaft such that at the tangential point, the angle between the direction of extent of the retaining means and the outer circumferential surface of the screw is <90 degrees. Consequently, the screw is axially moveable in the shaft without the quality of the captive securing means being impaired, and the screw is captively secured in the shaft by the retaining means resting on the outer circumferential surface of the screw.

15 Claims, 5 Drawing Sheets

… (US 8,920,090 B2)

CAPTIVE SECURING MEANS FOR A SCREW

CROSS-REFERENCE TO RELATED APPLICATION(S)

This application claims the benefit of and priority to German application serial number 102010038267.1 (DE) filed on 19 Oct. 2010 (19.10.2010) the contents of which are herein incorporated by reference in their entirety for any and all purposes.

FIELD

The invention relates to a captive securing means for a screw, having a shaft for holding the screw and having a retaining means arranged in the shaft.

BACKGROUND

Captive securing means are very important in various fields of application, such as in industrial connection technology, and serve, for example, to hold a screw in a moveable, but captive manner on a mounting part. Whereas in the prior art, screws are frequently inserted only during the final mounting of a mounting part, such as a housing cover, there is, however, a frequent demand that this mounting part be supplied for final mounting in a manner already combined with the necessary screws to form a mounting unit, so that the final mounting can be carried out in a comparatively much shorter time and, if appropriate, also in an automated manner.

To this end, the prior art discloses various captive securing means, which often have three solid or partially elastic protuberances which use the thread-free region of the screw or a recess in the screw as an undercut in order to form the captive securing means. However, such captive securing means have the disadvantage that, during the axial insertion of the screw into the captive securing means, the protuberances are partly sheared off, as a result of which, in the case of repeated axial movement of the screw, the protuberances no longer afford sufficient captive securing. Furthermore, such captive securing means are not necessarily suitable or even not at all suitable for screws having a continuous thread.

In view of the above deficiencies in the art, methods and systems are described below to provide a captive securing means for a screw, which captively secures the screw in a particularly simple and reliable manner.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one of various aspects of the disclosure, a captive securing means for a screw, having a shaft for holding the screw and having a retaining means arranged in the shaft is provided, comprising: the retaining means resting, in the inserted state of the screw, at a tangential point on the outer circumferential surface of the screw, the retaining means being arranged on the inner circumferential surface of the shaft, and the retaining means extending from the inner circumferential surface of the shaft in a substantially linear manner into the free region of the shaft such that at the tangential point the angle between the direction of extent of the retaining means and the outer circumferential surface of the screw is <90 degrees.

Other advantages and novel features may become apparent from the following detailed description when considered in conjunction with the drawings. As such, other aspects of the disclosure are found throughout the specification.

DETAILED DESCRIPTION

Figure 1:
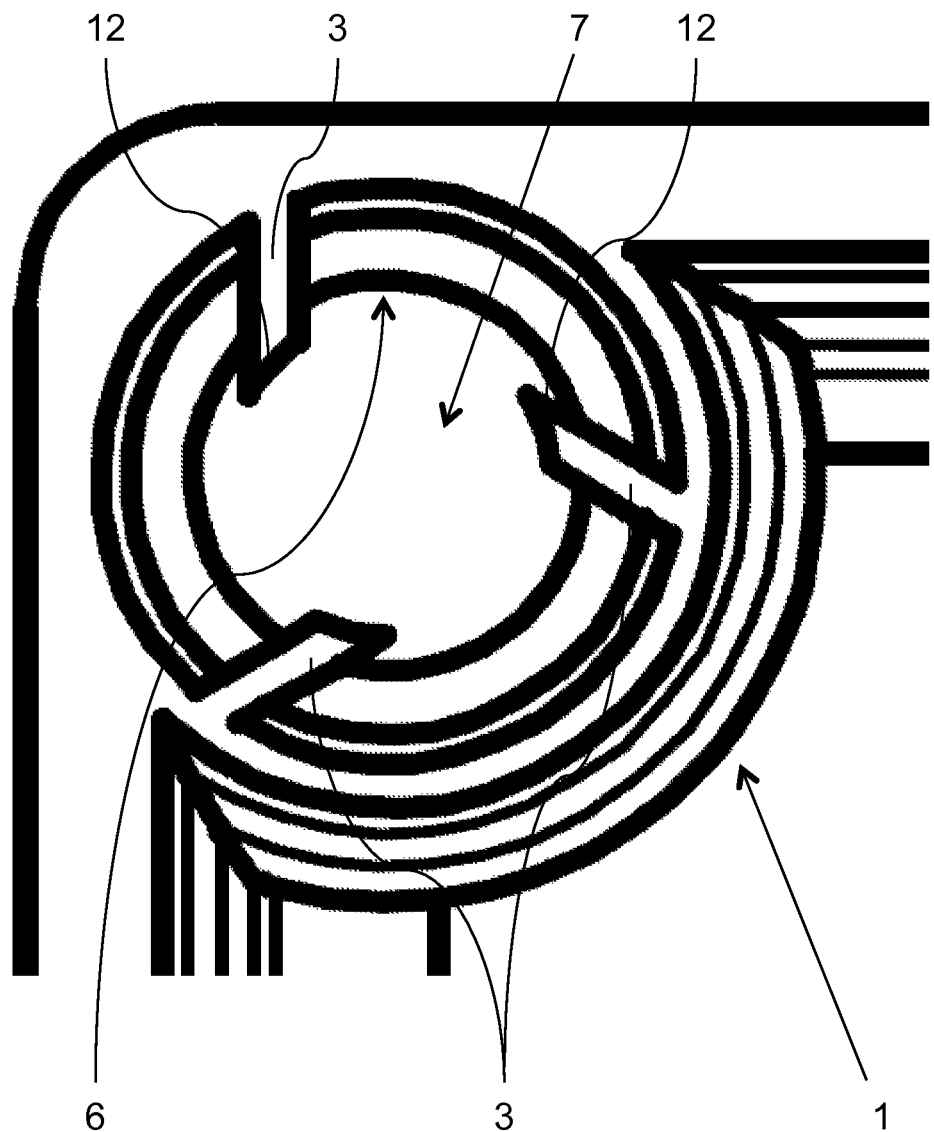
FIG. 1 shows a plan view of a captive securing means in accordance with an exemplary embodiment.

Various descriptions of an exemplary captive securing means for a screw are detailed below, having a shaft for holding the screw and having a retaining means arranged in the shaft, the retaining means resting, in the inserted state of the screw, at a tangential point on the outer circumferential surface of the screw, the retaining means being arranged on the inner circumferential surface of the shaft, and the retaining means extending from the inner circumferential surface of the shaft in a substantially linear manner into the free region of the shaft such that at the tangential point the angle between the direction of extent of the retaining means and the outer circumferential surface of the screw is <90 degrees.

A captive securing means, by way of which the screw is captively secured in the shaft in a particularly simple and secure manner, is thus specified. On account of the fact that, unlike the arrangements known from the prior art, the exemplary retaining means does not rest perpendicularly but at an angle of <90 degrees—that is to say "obliquely"—on the outer circumferential surface of the screw, the retaining means produces friction on the outer circumferential surface of the screw, and so the screw is captively secured in the shaft, and also the retaining means is prevented from shearing off during the axial movement of the screw in the shaft because the retaining means can move away, for example in a resilient manner, from the outer circumferential surface of the screw on account of the "oblique" arrangement thereof on the outer circumferential surface of the screw. This also makes it possible for dimensional deviations of the screw to be compensated for by the resilient action of the retaining means. In other words, the exemplary captive securing means thus ensures that the screw is axially moveable in a particularly simple manner in the shaft without the quality of the captive securing means being impaired, and also that the screw is captively secured in the shaft in a secure and reliable manner by the retaining means resting on the outer circumferential surface of the screw.

The exemplary captive securing means can be used with any desired screw known from the prior art. Preferably, the screw has a shank, it being possible for a thread to be provided on the shank of the screw so that in this case the outer circumferential surface of the screw is formed, for example, by the shank and/or the screw. In such a configuration, the retaining means rests, in the inserted state of the screw, at the tangential point on the outer circumferential surface of the shank and/or of the thread of the screw. In one exemplary embodiment, the retaining means rests, in the inserted state of the screw, on a tangential region of the outer circumferential surface of the screw, that is to say not only in a punctiform manner at the tangential point but in a planar manner on the tangential region. It is furthermore desired for the retaining means to extend in a linear manner into the shaft.

The shaft can be configured, for example, in a cylindrical or rectangular manner, the shaft and/or the retaining means preferably being made of a plastics material. In this case, the retaining means rests, in the inserted state of the screw, directly on the outer circumferential surface of the screw. In another embodiment, the retaining means is injection-molded onto the shaft. This disclosure, thus provides that the exemplary retaining means need not extend in a perpendicular manner from the inner circumferential surface of the shaft to the midpoint of the shaft, as is known from the prior art, but can extend into the shaft in an "oblique" manner from the inner circumferential surface of the shaft, such that the retaining means rests, in the inserted state of the screw, on the outer circumferential surface of the screw. In this case, the retaining means extends into the shaft preferably at an angle of <90 degrees between the tangent on the inner circumferential surface, said tangent running through the point of contact between the retaining means and the inner circumferential surface of the shaft, and the retaining means.

According to another exemplary embodiment, the retaining means further extends in the plug-in direction of the screw, the retaining means resting, in the inserted state of the screw, on a tangential line on the outer circumferential surface of the screw, the tangential point being located on the tangential line, and on the tangential line the angle between the direction of extent of the retaining means and the outer circumferential surface of the screw being <90 degrees. According to this embodiment, the retaining means can also extend to the midpoint of the shaft not only from the inner circumferential surface of the shaft in an "oblique" manner into the free region of the shaft, but for the retaining means also to extend in the plug-in direction of the screw, for example to have a cuboidal form. On account of the fact that the retaining means rests on the screw not only at the tangential point on the outer circumferential surface of the screw, but along the tangential line, preferably along the entire length of the retaining means extending in the plug-in direction of the screw, much greater friction is produced, thereby resulting in improved protection against the screw being lost.

According to another exemplary embodiment, the retaining means has a first bevel that extends in the plug-in direction of the screw, and the first bevel is arranged on the retaining means such that the first bevel, in the inserted state of the screw rests in a substantially parallel manner on the outer circumferential surface, which has the tangential point. It is desirable, in some embodiments for the first bevel to rest, in the inserted state of the screw, with its bevel surface parallel on the outer circumferential surface, which has the tangential point. It is desirable in some embodiments for the first bevel to have a radius and for the radius of the first bevel to correspond substantially to the radius of the screw. By way of such a configuration, it is possible for the retaining means or the first bevel of the retaining means to rest on the screw not only in a punctiform manner but in a planar manner, so that the friction between the retaining means and the screw is increased, thereby leading to improved protection against the screw being lost.

According to another advantageous configuration, the retaining means has a second bevel which extends perpendicularly to the plug-in direction of the screw, as a result of which it is easier to insert the screw into the shaft. Such a configuration makes it easier to insert the screw into the shaft in that, on account of the second bevel extending perpendicularly to the plug-in direction of the screw, during the insertion of the screw the retaining means is pressed from the free region of the shaft toward the inner circumferential surface of the shaft, and so the screw is axially moveable in the shaft.

In principle, the angle between the direction of extent of the retaining means and the outer circumferential surface of the screw can be configured to have any desired value <90 degrees. However, according to various exemplary embodiments, it can be provided that the angle is ≤80 degrees, preferably ≤70 degrees and very particularly preferably ≤60 degrees. It is furthermore desirable, in some embodiments, for the angle to be ≤50 degrees or ≤45 degrees. It is further desirable for the angle in the non-inserted state of the screw to be greater than in the inserted state of the screw, preferably 5 degrees, 10 degrees or 15 degrees greater. An embodiment of the last-mentioned type can be achieved in that the retaining means is directed closer to the midpoint of the shaft when the screw is not inserted than in the inserted state of the screw, the retaining means being pressed outward from the midpoint toward the inner circumferential surface of the shaft when the screw is inserted, for example by the provision of the second bevel.

According to another exemplary embodiment, n retaining means are provided, n being >2 and a integer number and the retaining means being arranged on the shaft in an offset manner at a spacing of essentially 360/n degrees. In one example, three retaining means are provided in the shaft, the three retaining means being arranged on the shaft in an offset manner at a spacing of essentially 120 degrees. It is furthermore desirable for the shaft and the retaining means to be embodied in one piece.

In principle, the retaining means can be configured as desired. However, according to some embodiments, the retaining means can be configured in a rib-like, web-like and/or cuboidal manner. It is furthermore desirable, in some embodiments, for the retaining means to be configured in a resilient manner. Thus, the retaining means can be injection-molded on the shaft for example as a resilient rib.

In one embodiment, a housing is provided, having a captive securing means, as explained above, and a housing cover. In this embodiment, it being possible to fasten the housing cover to the housing by way of the screw passed through the captive securing means. Such a configuration makes available a housing which is distinguished by particularly simple and reliable captive securing. Specific details of various embodiments are described in the following description of the accompanying Figures.

Figure 2:
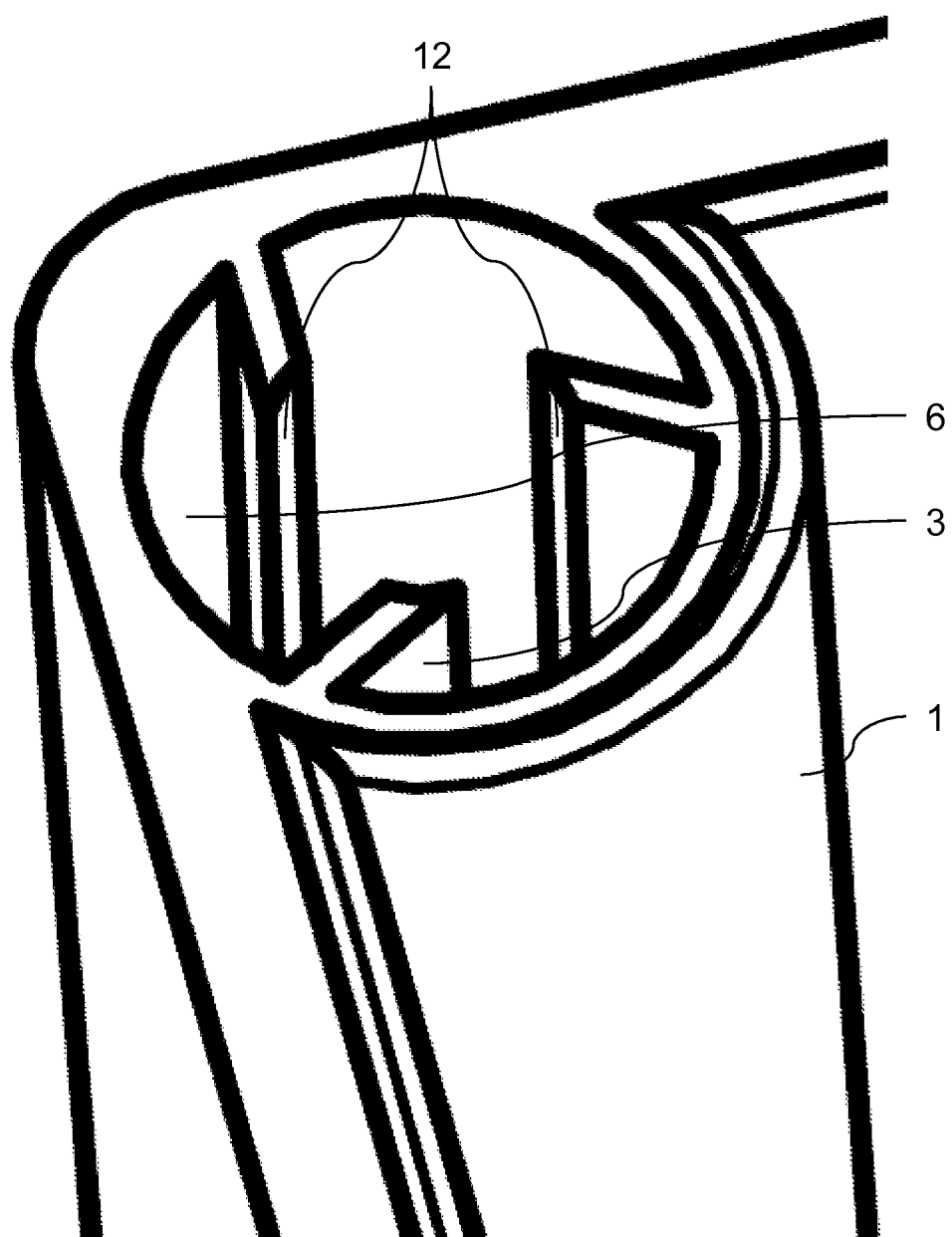
FIG. 2 shows a perspective view of the captive securing means according to an exemplary embodiment.
Figure 3:
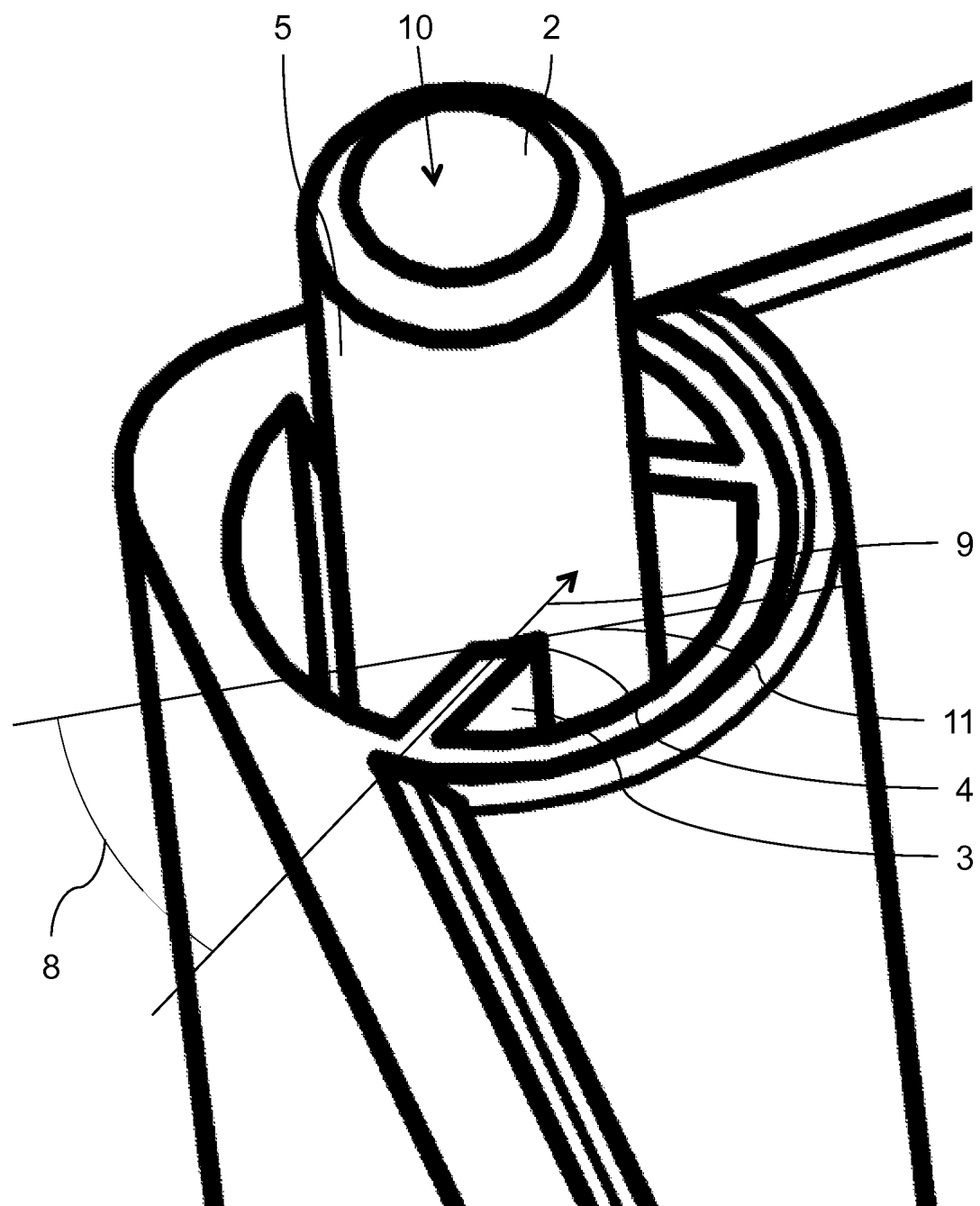
FIG. 3 shows a perspective view of the captive securing means with a screw in accordance with an exemplary embodiment.

FIGS. 1 to 3 show an exemplary captive securing means. The captive securing means has a shaft 1 which, as can be seen from FIG. 2 and FIG. 3, has a substantially circular outside diameter. The shaft 1 is made in the present case from a plastics material and is configured to hold a screw 2, as can be seen from FIG. 3.

In order to provide the screw 2 in a captive manner in the shaft 1, three retaining means 3 are provided in the present case, said retaining means 3 being configured in one piece with the shaft 1. In this case, the retaining means 3 are configured such that, in the inserted state of the screw 2 into the shaft 1, a respective retaining means 3 rests at a respective tangential point 4 on the outer circumferential surface 5 of the screw 2.

The retaining means 3 arranged on the inner circumferential surface 6 of the shaft 1 is configured such that the retaining means 3 extends from the inner circumferential surface 6 of the shaft 1 in a linear manner into the free region 7 of the shaft 1, so that at the tangential point 4 the angle 8, as can be seen from FIG. 3, between the direction of extent 9 of the retaining means 3 and the outer circumferential surface 5 of the screw 1 at the tangential point 4, that is to say the tangent 11, is <90 degrees, in the present case 45 degrees.

The retaining means 3 furthermore extends in the plug-in direction 10 of the screw 2 and is configured in the present case in a rib-like manner as a cuboid. In this case, the retaining means 3 has a first bevel 12 which extends in the plug-in direction 10 of the screw 2, the first bevel 12, as can be seen from FIG. 3, or the bevel surface of the first bevel 12 resting, in the inserted state of the screw 2, in a substantially parallel manner on the outer circumferential surface 5, which has the tangential point 4, of the screw 2, or the first bevel 12 having essentially a curvature which corresponds to the radius of the screw 2.

Figure 5:
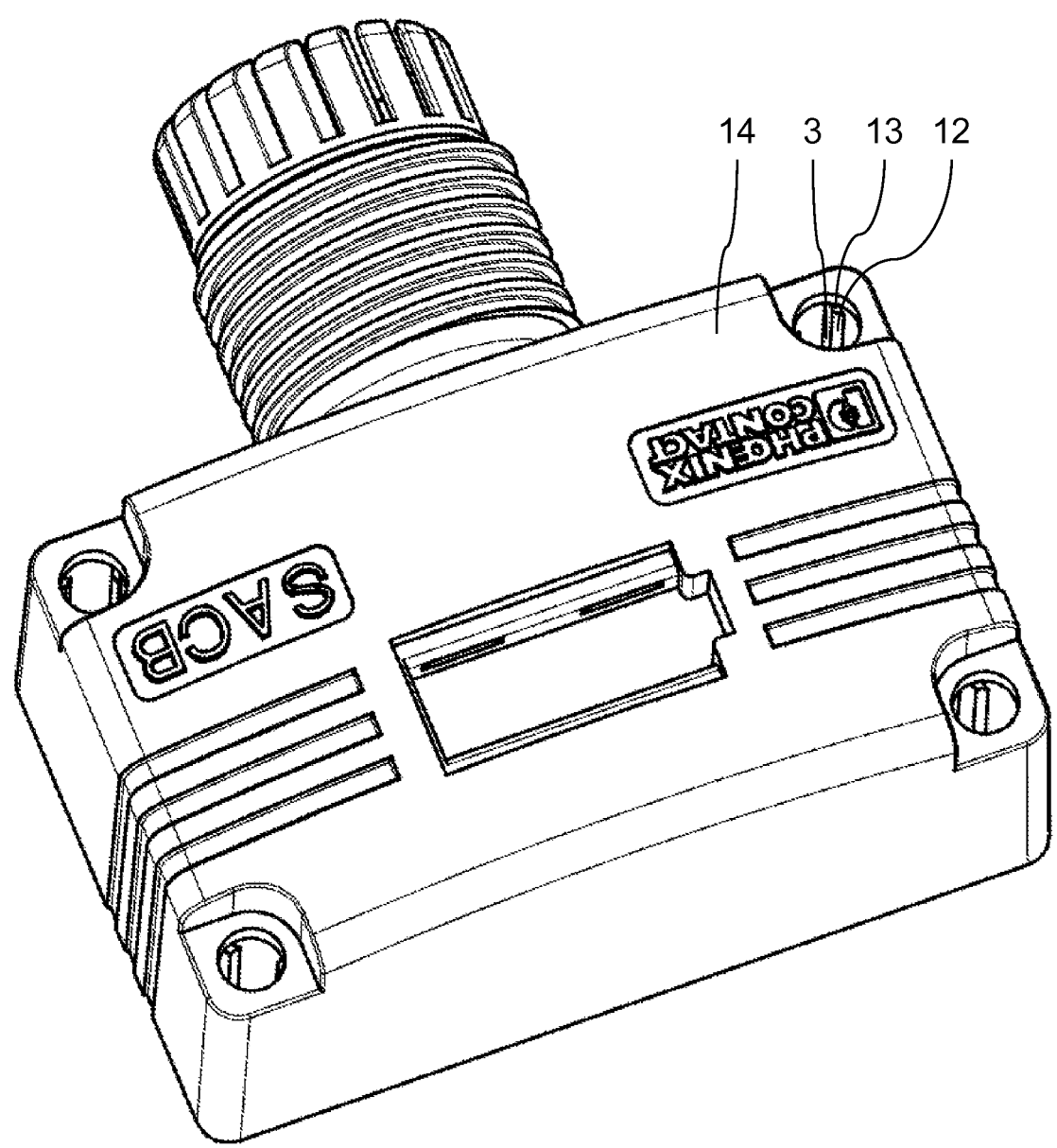
FIG. 5 shows a perspective rear view of a housing with a captive securing means in accordance an exemplary embodiment.

Furthermore, the retaining means 3 has a second bevel 13, as can be seen from FIG. 5. The second bevel 13 extends perpendicularly to the plug-in direction 10 of the screw 2, and so the bevel surface of the second bevel 13 is inclined toward the plug-in direction 10 of the screw 2. This second bevel 13 makes it easier to insert the screw 2 into the shaft 1, since on account of the second bevel 13 the resiliently configured retaining means 3 bend toward the periphery of the shaft 1, the screw 2 is axially moveable in the shaft 1, and on account of the resilience the retaining means 3 create friction on the screw 2 such that the screw 2 is held captively in the shaft 1.

Figure 4:
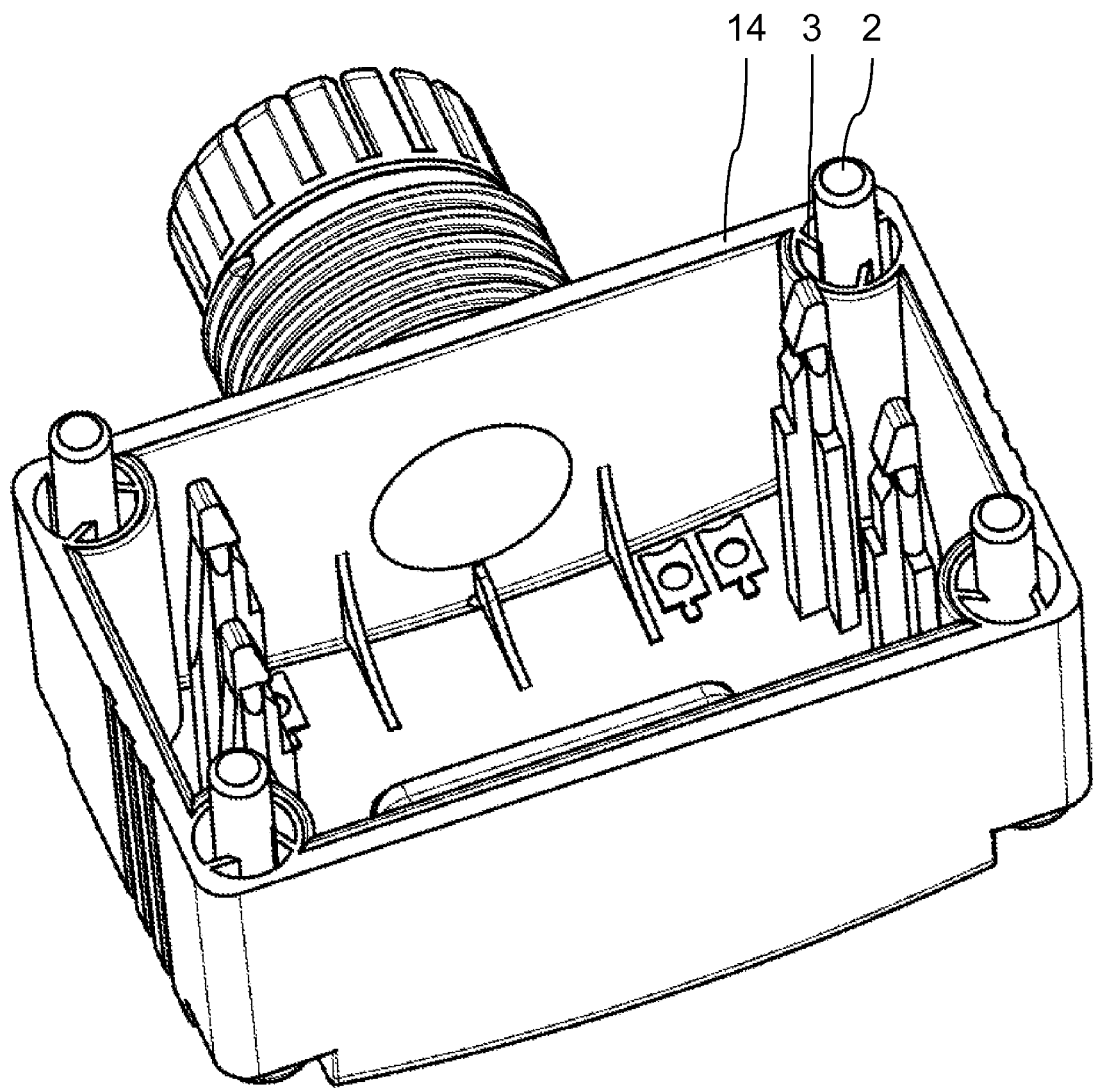
FIG. 4 shows a perspective view of a housing with a captive securing means in accordance with an exemplary embodiment.

FIG. 4 shows a housing 14 having four captive securing means arranged at the corners of the housing 14, it being possible to fasten a housing cover (not shown) by way of the screws 2 held captively on the housing 14.

FIG. 5 shows a rear view of the housing 14 so that the second bevel 13 can be seen, and is self explanatory.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A screw securing housing configured for insertion of a screw, comprising:
    a single, one piece integrally formed screw securer and housing cover,
    wherein the screw retainer is arranged in a shaft of the housing cover, a tangential point of the screw retainer adapted for resting on an outer circumferential surface of a retained screw, wherein the screw retainer is arranged on an inner circumferential surface of the shaft, and wherein the screw retainer extends from the inner circumferential surface of the shaft in a substantially linear manner into a free region of the shaft such that at the tangential point the angle between a direction of extent of the screw retainer and the outer circumferential surface of a retained screw is <90 degrees,
    wherein the screw retainer further has a first bevel that extends in the plug-in direction of a retained screw, the first bevel being arranged on the screw retainer such that the first bevel rests in a substantially parallel manner on the outer circumferential surface which comprises the tangential point, and the first bevel has a radius that corresponds substantially to a radius of a retained screw when inserted into the screw retainer,
    wherein the housing cover is adapted to be securely fastened to a housing by passing a screw through the screw retainer.

2. The screw securing housing of claim 1, wherein the screw retainer further comprises a first bevel that extends in a plug-in direction of a retained screw, wherein the first bevel is adapted to rest in a substantially parallel manner on the outer circumferential surface of a retained screw, and at the tangential point of a retained screw.

3. The screw securing housing of claim 2, wherein the screw retainer further comprises a second bevel which extends perpendicularly to the plug-in direction of a retained screw.

4. The screw securing housing of claim 1, wherein the angle is ≤60 degrees.

5. The screw securing housing of claim 1, further comprising n screw retainers where n is an integer >2, wherein the screw retainers are arranged on the shaft in an offset manner at a spacing of approximately 360/n degrees.

6. The screw securing housing of claim 1, wherein the screw retainer is configured in appearance substantially similar to a rib, web and/or cuboidal manner.

7. The screw securing housing of claim 1, wherein the screw retainer is configured in a resilient manner.

8. The screw securing housing of claim 1, further comprising a screw retained in the screw retainer.

9. A screw securing housing configured for insertion of a screw, comprising:
    a single, one piece integrally formed screw retainer and housing cover,
    wherein the screw retainer is arranged in a shaft of the housing cover, a tangential point of the screw retainer adapted for resting on an outer circumferential surface of a retained screw, wherein the screw retainer is arranged on an inner circumferential surface of the shaft, and wherein the screw retainer extends from the inner circumferential surface of the shaft in a substantially linear manner into a free region of the shaft such that at the tangential point the angle between a direction of extent of the screw retainer and the outer circumferential surface of a retained screw is <90 degrees,
    wherein the screw retainer further extends in a plug-in direction of a retained screw, the screw retainer adapted for resting on a tangential line on the outer circumferential surface of a retained screw, the tangential point being located on the tangential line, and on the tangential line an angle between the direction of extent of the screw retainer and the outer circumferential surface of a retained screw is <90 degrees,
    wherein the screw retainer further has a first bevel that extends in the plug-in direction of a retained screw, the first bevel being arranged on the screw retainer such that the first bevel rests in a substantially parallel manner on the outer circumferential surface which comprises the tangential point, and the first bevel has a radius that corresponds substantially to a radius of a retained screw when inserted into the screw retainer, wherein the housing cover is adapted to be securely fastened to a housing by passing a screw through the screw retainer.

10. The screw securing housing of claim 9, wherein the screw retainer further comprises a first bevel that extends in a plug-in direction of a retained screw, wherein the first bevel is adapted to rest in a substantially parallel manner on the outer circumferential surface of a retained screw, and at the tangential point of a retained screw.

11. The screw securing housing of claim 10, wherein the screw retainer further comprises a second bevel which extends perpendicularly to the plug-in direction of a retained screw.

12. The screw securing housing of claim 9, further comprising n screw retainers where n is an integer >2, wherein the screw retainers are arranged on the shaft in an offset manner at a spacing of approximately 360/n degrees.

13. The screw securing housing of claim 9, wherein the screw retainer is configured in appearance substantially similar to a rib, web and/or cuboidal manner.

14. The screw securing housing of claim 9, wherein the screw retainer is configured in a resilient manner.

15. The screw securing housing of claim 9, further comprising a screw retained in the screw retainer.

* * * * *